United States Patent [19]

Pawl

[11] Patent Number: 4,645,106

[45] Date of Patent: Feb. 24, 1987

[54] GARMENT CARRIER

[75] Inventor: E. Timothy Pawl, West Bloomfield, Mich.

[73] Assignee: Pawl Inventioneering Corporation, Bloomfield, Mich.

[21] Appl. No.: 724,262

[22] Filed: Apr. 17, 1985

[51] Int. Cl.⁴ .............................................. B60R 7/08
[52] U.S. Cl. .................................. 224/313; 224/311; 224/42.45 A; 223/94
[58] Field of Search ........ 224/313, 311, 273, 42.45 A; 296/37.13; 223/94

[56] References Cited

U.S. PATENT DOCUMENTS

| | | |
|---|---|---|
| 1,917,588 | 7/1933 | Johnson . |
| 2,064,087 | 12/1936 | Smith . |
| 2,071,257 | 2/1937 | Hansen ........................ 224/42.45 A |
| 2,235,439 | 3/1941 | Lion . |
| 2,542,163 | 2/1951 | Swalwell . |
| 2,558,583 | 6/1951 | Robins . |
| 2,577,854 | 12/1951 | Marbit . |
| 3,386,589 | 6/1968 | Prete, Jr. ........................... 223/94 X |
| 3,584,772 | 6/1971 | Robertson . |
| 3,596,815 | 8/1971 | Willett . |
| 3,705,673 | 12/1972 | Mohammar . |
| 3,802,610 | 4/1974 | Love et al. ........................... 223/94 |
| 3,845,890 | 11/1974 | Johns . |
| 4,221,354 | 9/1980 | Kempkers ............... 224/42.45 A X |
| 4,444,344 | 4/1984 | Marcus et al. . |

FOREIGN PATENT DOCUMENTS 8000004  1/1980  PCT Int'l Appl. ................... 223/94

Primary Examiner—Stephen Marcus
Assistant Examiner—Robert M. Petrik
Attorney, Agent, or Firm—Cullen, Sloman, Cantor, Grauer, Scott & Rutherford

[57] ABSTRACT

A garment carrier for use in an automobile or similar vehicle having a first or closed position wherein the garment carrier is concealed by the interior molding of the vehicle and a second or open position wherein the garment carrier can support a garment thereon. The garment carrier has two elongated members each having adjacent end portions and recessed regions. The adjacent end of one elongated member is receivable by the recessed member on the other elongated member with both the adjacent ends and the recessed regions being uniquely constructed to retain the elongated member in the open position.

30 Claims, 10 Drawing Figures

GARMENT CARRIER

BACKGROUND OF THE INVENTION

The present invention relates to a garment carrier such as a coat hanger which may be used in various environments, as an example, in an automobile or similar vehicle. More particularly, the present invention relates to a garment carrier which may be secured to the interior of a vehicle in such a way that in a first or closed position the garment carrier is concealed to look like part of the vehicle interior molding and in a second or open position the garment carrier is adapted to support a garment.

A conventional means for supporting a garment within a vehicle is to hang the garment over an L-shaped hook provided at an upper section of the vehicle interior over a rear side window. This type of garment supporting means can leave unsightly creases in the garment due to the weight of the garment not being distributed over a large area, but rather being concentrated at the relatively small area of the L-shaped hook.

To prevent creases in the garment, an ordinary clothes hanger can be used to support the garment on the L-shaped hook. An ordinary clothes hanger distributes the weight of the garment over a larger area. However, this requires having a clothes hanger available.

U.S. Pat. No. 3,386,589 issued to E. Prete, Jr. discloses a hanger apparatus specifically adapted for use in a vehicle. Prete attempts to overcome the disadvantage of having to have a clothes hanger available by providing a close hanger which is pivotally attached to a spring loaded head portion supported by an L-shaped hook or attached directly to the automobile interior. When the hanger is to be used it is pivoted downwardly to support the garment, and when the hanger is not to be used it is pivoted upwardly and retained in an upward position by the head portion.

One of the problems with the Prete hanger is when the garment hanger is not in use, that is when the hanger is pivoted upwardly, it is unsightly. There is no way to pivot the hanger out of sight; therefore, the hanger is in plan view and detracts from the aesthetic value of the automobile interior.

BRIEF SUMMARY OF THE INVENTION

The present invention overcomes the disadvantages of prior garment carriers by providing an improved garment carrier that may be used in various environments such as in an automobile or similar vehicle, that supports the garment without creating unsightly creases and that may be concealed within the interior of the automobile or similar vehicle when it is not in use.

The improved garment carrier utilizes two elongated support members which are pivotally connected at adjacent ends. In a first or closed position, when the garment carrier is not in use, the elongated support members are concealed to appear as part of the vehicle interior molding as for example by being concealed within recesses formed in the molding. The garment carrier may also be concealed by having the same general appearance as the molding but only being positioned on the surface of the existing molding without recesses being formed in the molding. When the garment carrier is to be used it is pivoted to a second or open position where a garment may be supported thereon. In the second position the elongated support members extend downwardly from the pivotal connecting point forming an inverted V-shape. The adjacent ends of the elongated support members are uniquely structured to retain the elongated support members in the second or open position permitting garments to be supported thereon.

In a modified embodiment of the present invention, a locking means is provided on each of the adjacent ends of the elongated support members to lock the garment carrier in the first or closed position and to cooperate with the uniquely structured adjacent ends to retain the garment carrier in the second or open position.

In addition each of the embodiments may be used with a conventional L-shaped hook which is supported by the same pivot fasteners as the support members.

DETAILED DESCRIPTION OF THE INVENTION

Figure 1:
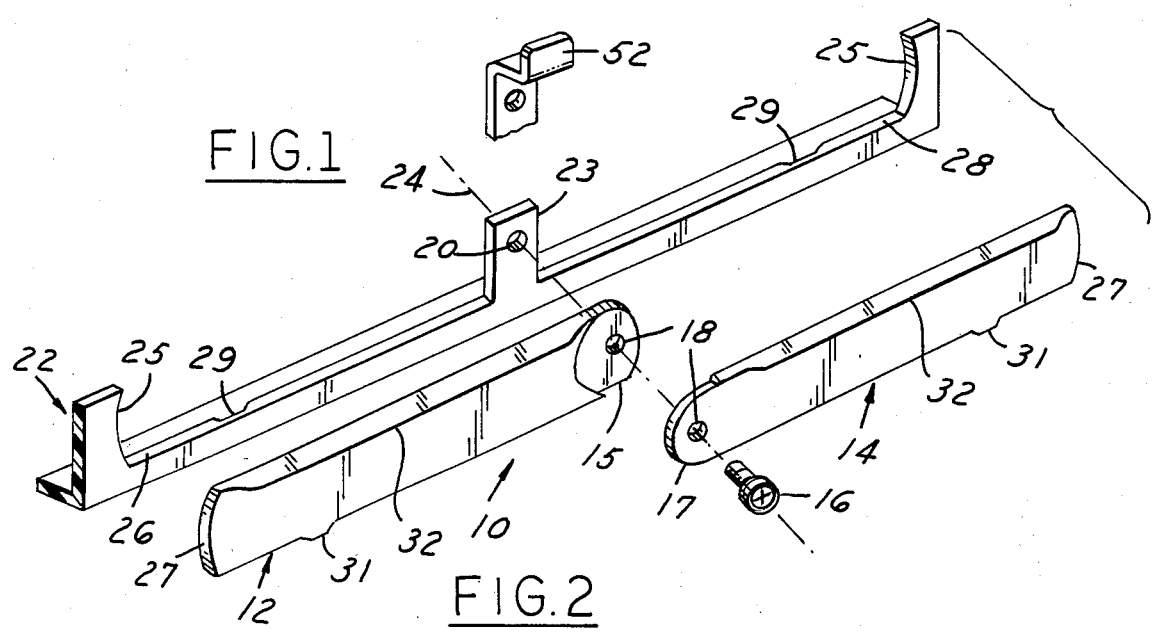
FIG. 1 is an exploded view of the garment carrier in the first or closed position.
Figure 2:
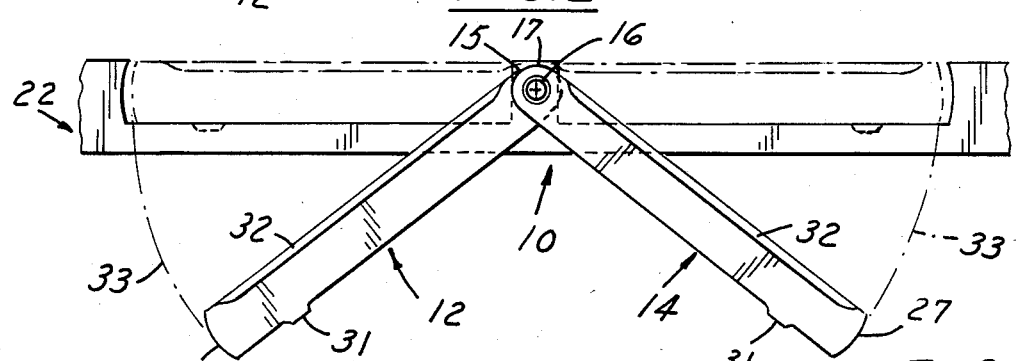
FIG. 2 is the garment carrier of FIG. 1 in the second or open position.

Referring to FIG. 1, the preferred embodiment of the garment carrier 10 of the present invention is illustrated in an exploded perspective view. FIG. 1 illustrates the garment carrier 10 in a first or closed position wherein the garment carrier 10 is not in use and is concealed to look like the interior molding 22 of a vehicle. FIG. 2 illustrates the garment carrier 10 of FIG. 1 in a second or open position wherein a garment such as a coat may be supported thereon. The garment carrier 10 may be made from, as for example, polycarbonate or polypropylyne.

The garment carrier 10 has a first elongated member 12 and a second elongated member 14 pivotally connected at adjacent ends 15 and 17. Each of the opposite ends 27 is formed by an arcuate edge or surface. Both elongated members 12 and 14 are substantially the same shape and may be formed without resetting the forming apparatus.

The pivotal connection is formed by a fastening means 16, preferably a sleeve centered pin with a head portion, received by openings 18 in adjacent ends 15 and 17. The openings 18 loosely receive fastening means 16 to permit easy movement of elongated members 12 and 14 between the first or closed position and the second or open position. The fastening means 16 is then received by an opening 20 formed in a bracket or tab 23 provided in the interior molding 22 of a vehicle. The first and second elongated members 12 and 14 are pivotable with respect to the interior molding 22 about a horizontal axis 24 coaxial with the center line of fastening means 16 and openings 18 and 20.

A first elongated upwardly opening notch 26 and a second elongated upwardly opening notch 28 extend in a direction perpendicular to horizontal axis 24 and are located on opposite sides of tab 23. The notches 26 and 28 are shaped to receive first and second elongated members 12 and 14 respectively. The notches 26 and 28 have arcuate ends or curved surfaces 25 shaped similarly to the arcuate edge or surfaces 27 of the elongated members 12 and 14. When the garment carrier 10 is in the first or closed position the arcuate edges 27 are opposite and spaced from the arcuate ends 25. In FIG. 2, the elongated members 12 and 14 are shown by phantom lines in the first position, with arcuate edges 27 adjacent or opposite the arcuate ends 25. Also, in FIG. 2, the arcuate path of movement of the elongated members 12 and 14 is shown by the dotted lines 33.

Slots 29 are formed in molding 22 at the base of each notch 26 and 28 for receipt of tabs 31 formed on each elongated member 12 and 14. The tabs 31 extend downwardly from elongated members 12 and 14 and into the slots 29 when the garment carrier 10 is in the first or closed position to help retain the elongated members 12 and 14 in the notches 26 and 28. The elongated members 12 and 14 are flexible which permits them to be bent slightly rearwardly in a direction parallel to axis 24 for easy insertion of tabs 31 into slots 29.

Lateral flanges 32 are formed at the top portions of each elongated member 12 and 14. The flanges 32 extend outwardly, away from molding 22, in a direction parallel to axis 24.

To move the garment carrier 10 from the closed position to the open position each lateral flange 32 is grasped and lifted upwardly; this removes each tab 31 from each slot 29. With tabs 31 removed, the elongated members 12 and 14 can be pulled outwardly in a direction substantially parallel to axis 24 away from the molding 22. This releases the elongated members 12 and 14 from the notches 26 and 28 respectively. The outward movement of members 12 and 14 away from the stationary molding 22 is possible due to fastening means 16 being loosely fitted within openings 18 and the flexibility of the elongated members 12 and 14.

After having been released from notches 26 and 28, elongated members 12 and 14 can be pivoted about axis 24 to the second or open position which is illustrated in FIG. 2. In the open position, a garment such as a coat may be supported on the downwardly extending elongated members 12 and 14. Thus, when the elongated members 12 and 14 are in the open angled or second position as shown in FIG. 2 the shoulders and arms of a body garment such as a large leather winter coat may be supported thereon. The elongated members 12 and 14 support the shoulders and arms of the garment. A conventional L-shaped hook member 52 carried by fastener 16 may also be provided for additional garments.

Figure 3:
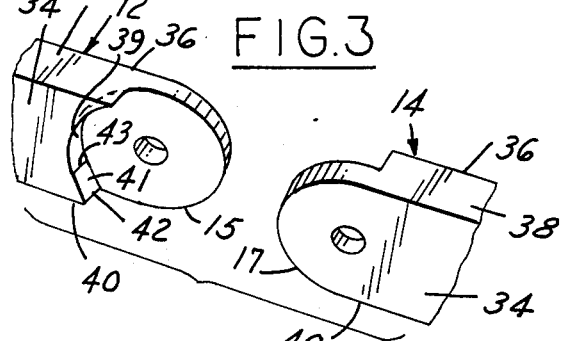
FIG. 3 is a partial perspective view of the first and second elongated members of FIG. 1.
Figure 4:
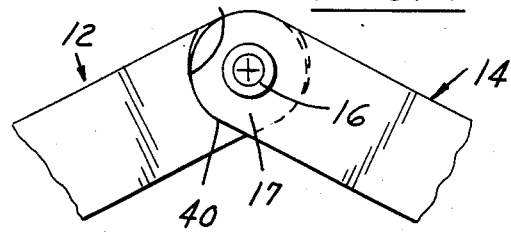
FIG. 4 is a partial view of the first and second elongated members of FIG. 2.

The garment carrier 10 is held in the open position by the unique structure provided on adjacent ends 15 and 17. With reference to FIGS. 3 and 4 this unique structure will be described.

Elongated members 12 and 14 each has a front surface 34, a rear surface 36, a top surface 38 and a bottom surface 40. The surfaces 34, 36, 38 and 40 are generally flat. The adjacent end 15 and 17 of each elongated member 12 and 14 is one-half the thickness of the elongated member 12 and 14, as measured from the front surface 34 to the rear surface 36, the opposing one-half thickness having been removed forming a recessed region in each elongated member 12 and 14, making the adjacent ends 15 and 17, when connected, equal in width to the overall width of the elongated members 12 and 14. The outer periphery of each adjacent end 15 and 17 is arcuate or curved.

A partially arcuate edge 42 is formed by the removal of the opposing one-half thickness of each elongated member 12 and 14. The edge 42 extends from the top surface 38 to the bottom surface 40 having an arcuate upper portion 39 that leads to and intersects a straight lower portion 41 approximately midway between the top and bottom surfaces 38 and 40 at a line of intersecion 43. See FIG. 3.

When the elongated members 12 and 14 are pivotally connected and in the closed position, the adjacent end 15 overlaps the adjacent end 17 and each adjacent end 15 and 17 abuts the respective edge of the opposing elongated member 12 and 14 at the line of intersection 43.

When the elongated members 12 and 14 are pivoted to the second or open position the arcuate or curved outer periphery of each adjacent end 15 and 17 slides along the arcuate portion 39 of the respective edge 42 until the bottom surface 40 of the elongated member 12 and 14 contacts the straight lower portion 41 of the respective edge 42. This contact between edge 42 and bottom surface 40 of each elongated member 12 and 14 retains the members in the open position and permits the garment carrier 10 to support loads up to 15 pounds, as an example, which corresponds to the weight of a large leather winter coat.

Figure 5:
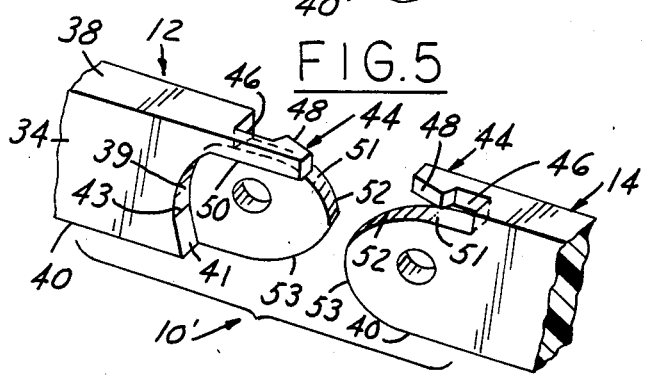
FIG. 5 is a partial perspective view of a modified embodiment of the first and second members of FIG. 1.
Figure 6:
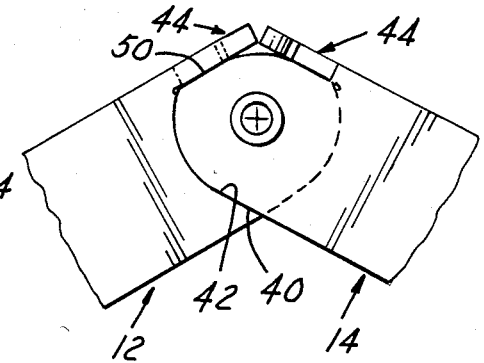
FIG. 6 is a partial view of the modified first and second members of FIG. 5 in the second or open position.

With reference to FIGS. 5 and 6 a modified embodiment of the garment carrier will be described. In the modified garment carrier 10', a locking member 44 is formed at the top surface 38. The locking member 44 has a recess 46, a hook 48 and a bottom flat surface 50 that is approximately one-half the thickness of the elongated members 12 and 14 and forms a continuation of each partially arcuate edge 42 extending from the beginning of the arcuate portion 39 in a direction perpendicular to the axis 24 toward the opposing elongated member 12 and 14. The recess 46 and hook 48 of elongated member 12 faces away from the front surface 34 and the recess 46 and hook 48 of the elongated member 14 faces away from the rear surface 36.

Further, in the modified embodiment, each adjacent end 15 and 17 has an outer periphery that has an upper portion 51 that is arcuate or curved that leads to a substantially straight portion 52 that leads to an arcuate or curved lower portion 53.

In the closed position, the hooks 48 are in the recesses 46. When the elongated members 12 and 14 are being pivoted to the open position, the hooks 48 cam against each other to release themselves from the recesses or slots 46. Simultaneously, the lower portion 53 of each adjacent end 15 and 17 slides along the arcuate portion 39 of each respective arcuate edge 42 and the upper portion 51 slides along the bottom flat surface 50 of the locking member 44.

In the second or open position, the bottom surface 40 of each elongated member 12 and 14 is in contact with the straight portion 41 of each arcuate edge 42. Additionally, the straight portion 52 of each adjacent end 15 and 17 is in contact with the bottom flat surface 50 of the locking member 44 of the opposing elongated member 12 and 14. The contact between the straight portion 52 of each adjacent end 15 and 17 and the bottom flat surface 50 of each locking member 44 provides additional support and contributes to handling larger loads that may be applied to the elongated members 12 and 14.

Figure 7:
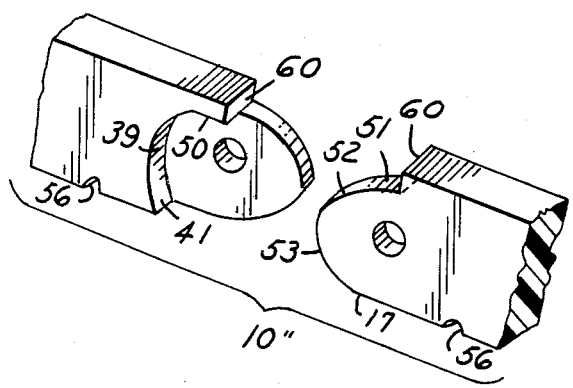
FIG. 7 is a partial perspective view of another modified garment carrier, specifically designed for use with a torsion spring such as shown in either FIG. 9 or FIG. 10, for automatically returning the garment carrier from the open position (FIG. 8) to the closed position.
Figure 8:
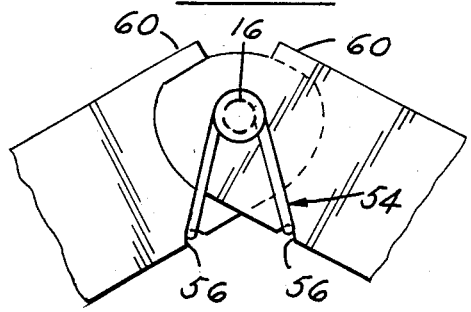
FIG. 8 is the partial view of the spring loaded automatic return garment carrier shown in the open position.
Figure 9:
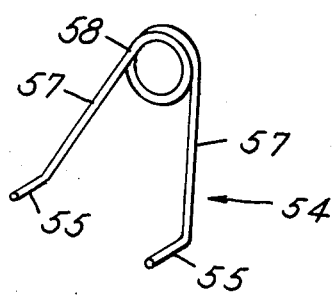
FIG. 9 is a perspective view of a wound torsion spring.
Figure 10:
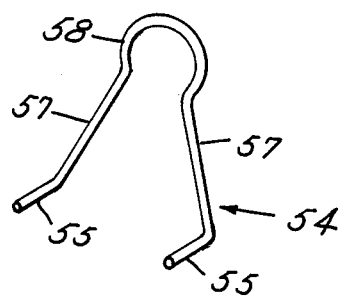
FIG. 10 is a perspective view of an arc torsion bar spring.

With reference to FIGS. 7 and 8 a further modified embodiment of the present invention will be described. Garment carrier 10" is uniquely designed to use a torsional spring 54, which for example may be a wound torsion spring, see FIG. 9, or an arc torsion bar spring, see FIG. 10, which automatically returns the elongated members 12 and 14 to and retains them in the first or closed position when a garment has been removed. The spring 54 is a safety feature to prevent injury by ensuring the elongated members 12 and 14 are automatically returned to the first or closed position and retained when the carrier 10" is not in use.

The spring 54 has two foot portions 55 extending outwardly from and perpendicular to two leg portions 57 that end in a loop 58. The spring 54 is connected to the garment carrier 10" by the feet 55 which are received in notches 56 formed on the bottom surface 40 of each member 12 and 14 and by the loop 58 which is fastened to the members 12 and 14 by the fastening means 16. Stop means 60, which replace the locking members 44, prevent the spring 54 from biasing the members 12 and 14 to a position beyond the first or closed position.

The garment carrier 10, 10' or 10" may be pivotally attached to the surface of the existing molding of a vehicle, such as an automobile, without having upwardly opening notches formed in the vehicle molding; the garment carrier being concealed as part of the molding by being the same general shape and color of the existing molding. The garment carrier may also be used as a conventional hanger without being pivotally connected to the molding by having a conventional hook adjacent the tab 23, the uniquely structured ends permitting the garment carrier to be compactly folded when it is not in use.

Thus it is apparent that there has been provided, in accordance with the invention, an improved garment carrier that fully satisfies the objects, aims and advantages set forth above. While the invention has been described in conjunction with specific embodiments thereof it is evident that many alternatives, modifications, and variations will be apparent to those skilled in the art in light in the foregoing description. Accordingly it is intended to embrace all such alternatives, modifications, and variations as fall within the spirit and broad scope of the appended claims.

What is claimed is:

1. A carrier having first and second elongated members each having a first surface, a second surface and an adjacent end portion, each of said elongated members being pivotally connected at said adjacent end portions for pivoting about a horizontal axis from a first position where said members are substantially horizontal to one another substantially forming one continuous member, to a second position where each of said members are angled with respect to one another;

said first elongated member having a first recessed region formed in said first surface at said adjacent end portion;

said second elongated member having a second recessed region formed in said second surface at said adjacent end portion;

said first recessed region operatively receiving said adjacent end portion of said second elongated member;

said second recessed region operatively receiving said adjacent end portion of said first elongated member;

said adjacent end portions sliding within said recessed regions between said first position and said second position, said adjacent end portions and said recessed regions mutually cooperating in said second position to support said first and said elongated members with respect to each other, whereby a garment may be supported on said elongated members.

2. The carrier of claim 1, wherein each of said recessed regions are recessed into the respective elongated members in a direction parallel to said horizontal axis to a depth midway between said first surface and said second surface, each of said adjacent end portions having the same thickness in a direction parallel to said horizontal axis as the thickness midway between said first surface and said second surface, whereby said recessed regions and adjacent end portions have an overall thickness in the direction of said horizontal axis equal to the thickness of each of said elongated members in the direction of said horizontal axis.

3. The carrier of claim 1, wherein each of said adjacent end portions has a curved outer peripheral surface leading to a flat bottom surface perpendicular to said horizontal axis.

4. The carrier of claim 3, wherein each of said recessed regions has a continuous edge section having a first arcuate portion radially spaced from said pivot axis in a direction away from said adjacent end portions, said first arcuate portion leading to a straight portion.

5. The carrier of claim 4, wherein said flat bottom surface contacts and is supported by said straight portion when said elongated members are in said second position.

6. The carrier of claim 1, further comprising a locking member whereby said elongated arms may be locked in the first position.

7. The carrier of claim 1, wherein each of said adjacent end portions has an outer peripheral surface having an upper portion that is curved leading to a straight portion that leads to a curved lower portion, said lower portion ending in a flat bottom surface perpendicular to said horizontal axis.

8. The carrier of claim 7, further comprising a locking member having a flat bottom surface extending perpendicular to said horizontal axis forming a horizontal elongated flat surface, said straight portion abutting said flat bottom surface when said elongated members are in the second position.

9. The carrier of claim 1, wherein said elongated members are concealed in said first position by a strip of molding.

10. The carrier of claim 1, further comprising a spring means for biasing said first and second elongated members to said first position, whereby said carrier will automatically return from said second position to said first position upon removal of a garment from said first and second elongated members.

11. The carrier of claim 10, further comprising a stop means to prevent said spring means from over-biasing said first and second elongated members from said second position to beyond said first position.

12. A carrier, for use in a vehicle having a mounting element having first and second elongated members;

said first and second elongated members each having a first surface, a second surface and an adjacent end portion, said elongated members at said adjacent end portions being pivotally mounted on said mounting element by connecting means for pivoting about a horizontal axis from a first position where said members are substantially horizontal to one another substantially forming one continuous member, to a second position where each of said members are angled with respect to one another;

said first elongated member having a first recessed region formed in said first surface at said adjacent end portion;

said second elongated member having a second recessed region formed in said second surface at said adjacent end portion;

said first recessed region operatively receiving said adjacent end portion of said second elongated member;

said second recessed region operatively receiving said adjacent end portion of said first elongated member;

said adjacent end portions sliding within said recessed regions between said first position and said second position, said adjacent end portions and said recessed regions mutually cooperating in said second position to support said first and said second elongated members with respect to each other, whereby a garment may be directly supported on said elongated members.

13. The carrier of claim 12, wherein each of said recessed regions are recessed into the respective elongated members in a direction parallel to said horizontal axis to a depth midway between said first surface and said second surface, each of said adjacent end portions having the same thickness in a direction parallel to said horizontal axis as the thickness midway between said first surface and said second surface, whereby said recessed regions and adjacent end portions have an overall thickness in the direction of said horizontal axis equal to the thickness of each of said elongated members in the direction of said horizontal axis.

14. The carrier of claim 12, wherein each of said adjacent end portions has a curved outer peripheral surface leading to a flat bottom surface perpendicular to said horizontal axis.

15. The carrier of claim 14, wherein each of said recessed regions has a continuous edge section having a first arcuate portion radially spaced from said pivot axis in a direction away from said adjacent end portions, said first arcuate portion leading to a straight portion.

16. The carrier of claim 15, wherein said flat bottom surface contacts and is supported by said straight portion when said elongated members are in said second position.

17. The carrier of claim 12, further comprising a locking member whereby said elongated arms may be locked in the first position.

18. The carrier of claim 12, wherein each of said adjacent end portions has an outer peripheral surface having an upper portion that is curved leading to a straight portion that leads to a curved lower portion, said lower portion ending in a flat bottom surface perpendicular to said horizontal axis.

19. The carrier of claim 18, further comprising a locking member having a flat bottom surface extending perpendicular to said horizontal axis forming a horizontal elongated flat surface, said straight portion abutting said flat bottom surface when said elongated members are in the second position.

20. The carrier of claim 12, further comprising spring means for biasing said first and second elongated members to said first position, whereby said carrier will automatically return from said second position to said first position upon removal of a garment from said first and second elongated members.

21. The carrier of claim 20, further comprising stop means to prevent said spring means from over-biasing said first and second elongated members from said second position to beyond said first position.

22. The carrier of claim 12, wherein said mounting element includes a molding having first and second notches formed therein to receive said first and second elongated members when said members are in said first position.

23. The carrier of claim 12, further comprising an additional support member positioned above and having the same connecting means as said elongated members.

24. A carrier for use in a vehicle having a mounting element; said carrier comprising:

first and second elongated members having front and back faces and adjacent end portions, said elongated members being pivotally mounted at said adjacent end portions on said mounting element by connecting means for pivoting about a horizontal axis from a first position wherein said members are substantially horizontal to one another substantially forming one continuous member, to a second position wherein each of said members are angled with respect to one another;

said first elongated members having a first recessed region in said front face at said adjacent end portions and said second elongated member having a second recessed region formed in said back face at said adjacent end portion;

each of said recessed regions including a continuous end section having a first arcuate portion radially spaced from said pivot axis in a direction away from said adjacent end portions and a straight portion, said first arcuate portion leading to said straight portion;

each of said adjacent end portions including a curved outer peripheral surface leading to a flat bottom surface perpendicular to said horizontal axis;

said first recessed region operatively receiving said adjacent end portion of said second elongated member and said second recessed region operatively receiving said adjacent end portion of said first elongated member;

said adjacent end portions sliding within said recessed regions between said first position and said second position with said flat bottom surfaces contacting and being supporting by said straight portions in said second position such that a garment may be supported upon said elongated members when in said second position.

25. The carrier of claim 24, wherein each of said recessed regions are recessed into the respective elongated members in a direction parallel to said horizontal axis to a depth midway between said front surface and said back surface, each of said adjacent end portions having the same thickness in a direction parallel to said horizontal axis as the thickness midway between said front surface and said back surface, whereby said recessed regions and adjacent end portions have an overall thickness in the direction of said horizontal axis equal to the thickness of each of said elongated members in the direction of said horizontal axis.

26. The carrier of claim 24, further comprising a locking member whereby said elongated members may be locked in the first position.

27. The carrier of claim 24, further comprising spring means for biasing said first and second elongated members to said first position, whereby said carrier will automatically return from said second position to said first position upon removal of a garment from said first and second elongated members.

28. The carrier of claim 27, further comprising stop means to prevent said spring means from over-biasing said first and second elongated members from said second position to beyond said first position.

29. The carrier of claim 24, wherein said mounting element includes a molding having first and second notches formed therein to receive said first and second elongated members when said members are in said first position.

30. The carrier of claim 24, further comprising an additional support member positioned above and having the same connecting means as said elongated members.

* * * * *